United States Patent

Schell

[11] Patent Number: 5,804,313
[45] Date of Patent: Sep. 8, 1998

[54] POLYAMIDE AND ACRYLIC POLYMER COATED GLASS FIBER REINFORCEMENTS, REINFORCED POLYMERIC COMPOSITES AND A METHOD OF REINFORCING A POLYMERIC MATERIAL

[75] Inventor: Philip L. Schell, Pittsburgh, Pa.

[73] Assignee: PPG Industries, Inc., Pittsburgh, Pa.

[21] Appl. No.: 679,778

[22] Filed: Jul. 15, 1996

[51] Int. Cl.$^6$ .................................................. B32B 17/02
[52] U.S. Cl. ...................... 428/391; 428/373; 428/378; 428/380; 428/383; 428/392; 428/395
[58] Field of Search ................... 428/373, 378, 428/380, 383, 391, 392, 395

[56] References Cited

U.S. PATENT DOCUMENTS

| | | | |
|---|---|---|---|
| 3,654,370 | 4/1972 | Yeakey | 260/584 |
| 3,676,287 | 7/1972 | Flautt et al. | 161/140 |
| 3,803,069 | 4/1974 | McWilliams et al. | 260/29.2 TN |
| 3,840,426 | 10/1974 | Flautt et al. | 428/295 |
| 3,882,090 | 5/1975 | Fagerburg et al. | 528/339 |
| 4,074,988 | 2/1978 | Eilerman et al. | 65/3 |
| 4,147,833 | 4/1979 | Eilerman et al. | 428/378 |
| 4,265,704 | 5/1981 | Nahta | 162/156 |
| 4,330,444 | 5/1982 | Pollman | 523/404 |
| 4,457,785 | 7/1984 | Hsu et al. | 106/308 N |
| 4,461,804 | 7/1984 | Motsinger et al. | 428/288 |
| 4,465,500 | 8/1984 | Motsinger et al. | 65/3.43 |
| 4,477,524 | 10/1984 | Brown et al. | 428/391 |
| 4,536,447 | 8/1985 | Hsu | 428/392 |
| 4,592,956 | 6/1986 | Gaa et al. | 428/391 |
| 4,615,946 | 10/1986 | Temple | 428/361 |
| 4,626,289 | 12/1986 | Hsu | 106/287.34 |
| 4,681,658 | 7/1987 | Hsu et al. | 162/156 |
| 4,681,802 | 7/1987 | Gaa et al. | 428/288 |
| 4,752,527 | 6/1988 | Sanzero et al. | 428/391 |
| 4,810,576 | 3/1989 | Gaa et al. | 428/391 |
| 5,197,202 | 3/1993 | Jensen | 34/23 |
| 5,229,202 | 7/1993 | Tomono et al. | 428/288 |
| 5,393,379 | 2/1995 | Parrinello | 162/101 |
| 5,437,928 | 8/1995 | Thimons et al. | 428/391 |

FOREIGN PATENT DOCUMENTS

| | | |
|---|---|---|
| 4-241917 | 8/1992 | Japan . |
| WO 94/00418 | 1/1994 | WIPO . |

OTHER PUBLICATIONS

Hawley's Condensed Chemical Dictionary, (12th E. 1993), pp. 15, 305, 331, 409, 435, 461, 815, 930, 931, 1075.

Kirk–Othmer, Encyclopedia of Chemical Technology, (1963) vol. 1, pp. 203–205, 259–297, 305–307, vol. 21, (1970), pp. 56–69, vol. 16 (1968), pp.1–2.

Encyclopedia of Polymer Science and Technology, (1964) vol. 1, pp. 110, 115, vol. 6, (1967) pp. 103–145, 505–712, vol. 10 (1969) pp. 483–597.

K. Whitten et al, General Chemistry, (1981), p. 192.

K. Loewenstein, the Manufacturing Technology of Continuous Glass Fibres, (3d Ed. 1993), pp. 30–44, 47–60, 115–122, 126–135, 165–172, 219–222, 232–289, (2d Ed. 1983), pp. 29, 33–45, 47–60, 118–120, 122–125.

Handbook of Plastic Materials and Technology, pp. 955–1062, 1179–1215, 1225–1271.

C. Henkee et at., "Water Soluble Polyamides", ANTEC 1995, pp. 3446–3448.

(List continued on next page.)

Primary Examiner—Richard Weisberger
Attorney, Agent, or Firm—Ann Marie Odorski

[57] ABSTRACT

The present invention provides a sized glass fiber strand adapted to reinforce a polymeric matrix material. The sizing composition includes a polyamide which is the reaction product of a polycarboxylic acid and a polyoxyalkylene amine; an acrylic polymer which is essentially free of epoxy functionality; a coupling agent and a fiber lubricant which is different from the polyamide, the sizing composition being essentially free of a urethane-containing polymer. Composites reinforced with the sized glass fiber strand and a method of reinforcing a composite are also provided.

17 Claims, 1 Drawing Sheet

OTHER PUBLICATIONS

C. Henkee et al., "Control of Properties in Water Soluble Polyamides", Publication of Huntsman Corp.

"Building Better Nonwovens", Technical Bulletin of Rohm and Haas Specialty Industrial Polymers (1994).

"RHOPLEX® HA–8, RHOPLEX® HA–12, RHOPLEX® HA–16", p. 2, Technical Bulletin of Rohm and Haas Company (Jan. 1978).

PN–3716–K Technical Data Sheet of H. B. Fuller Co. (Jul. 25, 1994).

"JEFFAMINE® Amines Polyoxyaklylene Amines", Technical Bulletin of Texaco Chemical Company (Jun. 20–21, 1990).

"Chemicals for the Textile Industry", p. 2, Technical Bulletin of Rohm and Haas Co. (Nov. 1977).

FIG. 1

POLYAMIDE AND ACRYLIC POLYMER COATED GLASS FIBER REINFORCEMENTS, REINFORCED POLYMERIC COMPOSITES AND A METHOD OF REINFORCING A POLYMERIC MATERIAL

CROSS REFERENCE TO RELATED APPLICATION

This patent application is related to the copending U.S. patent application Ser. No. 08/679,779, pending of Philip L. Schell entitled "POLYAMIDE SECONDARY COATING FOR FIBER STRANDS, COATED STRAND REINFORCEMENTS, REINFORCED POLYMERIC COMPOSITES AND A METHOD OF REINFORCING A POLYMERIC MATERIAL", filed concurrently with the present patent application.

FIELD OF THE INVENTION

This invention relates generally to glass fiber reinforcements and, more specifically, to glass fibers coated with a composition including an acrylic polymer and a polyamide which is the reaction product of (1) a polycarboxylic acid and (2) a polyoxyalkylene amine, which provide an inexpensive reinforcement for polymeric matrices such as nylon.

BACKGROUND OF THE INVENTION

Reinforced composites are rapidly growing in popularity for such applications as automobile components, boat hulls and fishing rods. Reinforced polymeric composites can be formed from a polymeric matrix material, reinforcing material and any other desired components in a variety of ways. For example, for a thermosetting matrix material, a composite can be formed by molding, pultrusion, filament winding, hand lay-up or spray-up. For a thermoplastic matrix material, suitable methods for forming a composite include direct molding or extrusion compounding followed by injection molding.

As molding processes become more sophisticated and raw material costs escalate, the need for an inexpensive reinforcement which provides adequate physical properties in a composite, such as strength, modulus and impact resistance, has become increasingly important.

The coating on the reinforcement provides an interface between the reinforcement material, such as glass fiber strand, and the polymeric matrix material of the composite. The compatibility of the coating with the reinforcement material and the polymeric matrix material and strength of the bonding at the interface are important considerations in the selection of coating components. The amounts and types of components used in the coating composition influence the cost of the reinforcement. It is desirable to include less expensive components in the coating composition to lessen cost while maintaining performance of the reinforcement in the composite.

U.S. Pat. No. 4,810,576 discloses coated strands of glass fibers useful in producing glass fiber paper (see Abstract). The coating includes an organo silane coupling agent, cationic surfactant and about 0.5 to greater than about 30 weight percent of a water-soluble, ungelled polymer such as a polyoxyethylene polymer, polyacrylic acid which has its functional groups neutralized with a base, polyacrylamides, polyvinyl pyrrolidone or polyvinyl alcohol (see column 6, line 5–column 7, line 2). The coating also includes about 2 to about 10 weight percent of an aldehyde-condensate-reactable polymeric agent, such as a polyacrylamide or polyamide, capable of interaction bonding with the coupling agent and paper binder, such as urea formaldehyde, melamine formaldehyde, phenol formaldehyde, epichlorohydrin and amino resins (see column 7, line 58–column 9, line 16). Polyamides which are the reaction product of a polycarboxylic acid and a polyoxyalkylene amine are not disclosed as aldehyde-condensate-reactable polymeric agents.

U.S. Pat. No. 4,330,444 discloses a sizing composition for glass fibers for reinforcing thermosetting molding compounds. The sizing composition includes an epoxy resin, melamine formaldehyde condensate, polyamide resin which can be obtained from dicarboxylic acids or their esters and di-primary polyamines (see col. 5, line 68–col. 6, line 1), thermoplastic plasticizing agent, one or more silane coupling agents and, optionally, a blend of vinyl-acrylic copolymer and epoxy resin as a plasticizer, as disclosed at col. 6, lines 13–23.

Japanese Patent Application No. 4241917 (abstract) discloses a glass fiber mat for reinforcing reaction injection molded nylon products. The glass fiber is treated with an epoxy-modified acrylic copolymer, nonionic surfactant such as a polyoxyethylene fatty acid amide, and an amino silane coupling agent.

In reinforcement of composites, including thermoplastics such as nylon, it is desirable to simplify and reduce the cost of coating composition components while providing coated reinforcements which have acceptable physical performance in the composite.

SUMMARY OF THE INVENTION

The present invention provides a glass fiber strand adapted to reinforce a polymeric matrix material, the strand having thereon a sizing composition comprising: (a) a polyamide which is the reaction product of (1) a polycarboxylic acid and (2) a polyoxyalkylene amine; (b) an acrylic polymer which is essentially free of epoxy functionality; (c) a coupling agent selected from the group consisting of organo silane coupling agents, transition metal coupling agents, amino-containing Werner coupling agents and mixtures thereof; and (d) a fiber lubricant which is different from the polyamide of (a), the sizing composition being essentially free of a urethane-containing polymer.

Another aspect of the present invention is a reinforced polymeric composite comprising: (a) a glass fiber strand reinforcing material having applied thereon a sizing composition comprising: (1) a polyamide which is the reaction product of (i) a polycarboxylic acid and (ii) a polyoxyalkylene amine; (2) an acrylic polymer which is essentially free of epoxy functionality; (3) a coupling agent selected from the group consisting of organo silane coupling agents, transition metal coupling agents, amino-containing Werner coupling agents and mixtures thereof; and (4) a cationic lubricant which is different from the polyamide of (1); and (b) a polymeric matrix material.

Another aspect of the present invention is a method for reinforcing a polymeric matrix material, the method comprising: (1) applying to a glass fiber strand reinforcing material a sizing composition comprising: (a) a polyamide which is the reaction product of (1) a polycarboxylic acid and (2) a polyoxyalkylene amine; (b) an acrylic polymer which is essentially free of epoxy functionality; (c) a coupling agent selected from the group consisting of organo silane coupling agents, transition metal coupling agents, amino-containing Werner coupling agents and mixtures thereof; and (d) a cationic lubricant which is different from the polyamide of (a); (2) at least partially drying the sizing composition to form a substantially uniform coating upon the reinforcing material; (3) dispersing the reinforcing material in the polymeric matrix material; and (4) at least partially curing the polymeric matrix material to provide a reinforced polymeric composite.

BRIEF DESCRIPTION OF THE DRAWING

The foregoing summary, as well as the following detailed description of the preferred embodiments, will be better understood when read in conjunction with the appended drawing. In the drawing.

DETAILED DESCRIPTION OF THE INVENTION

Figure 1:
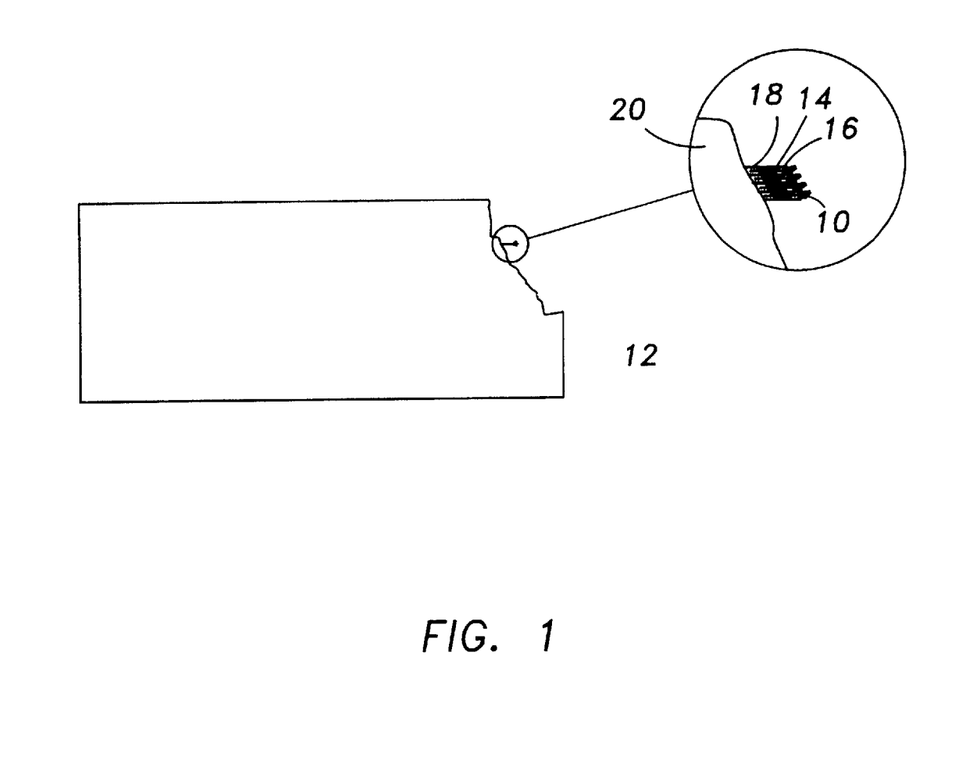
FIG. 1 is a top plan view of a portion of a composite according to the present invention, partially broken away to show coated glass fiber strands of the present invention.

The glass fiber strands 10 of the present invention which are adapted to reinforce polymeric composites 12 provide composites having acceptable physical properties, such as tensile and flexural strength and impact resistance, and represent an inexpensive alternative to conventional glass fiber strands coated with more costly components, such as polyurethane. As used herein, the term "strand" means a plurality of individual fibers. The term "fibers" means a plurality of individual filaments.

The glass fiber strand 10 of the present invention, shown in FIG. 1, has an essentially dried residue of a sizing composition 14 on at least a portion of its surface 16 to protect the surface 16 from abrasion during processing. Broadly stated, the sizing composition is preferably aqueous-based and includes components which are water soluble, emulsifiable, dispersible and/or curable. As used herein, the terms "size", "sized" or "sizing" refer to the aqueous composition applied to the glass fibers immediately after formation of the glass fibers. The term "secondary coating" refers to a coating composition applied secondarily to the strands after the sizing composition is applied, and preferably at least partially dried.

The sizing composition for the glass fiber strands of the present invention comprises one or more polyamides which are the reaction products of (1) one or more polycarboxylic acids and (2) one or more polyoxyalkylene amines. The polycarboxylic acid and polyoxyalkylene amine are preferably reacted at a 1:1 molar ratio, although this ratio can vary.

As used herein, the term "polyamide" means a high molecular weight polymer in which amide linkages (—CONH—) occur along the molecular chain. *Hawley's Condensed Chemical Dictionary*, (12th Ed. 1993) at page 930, which is hereby incorporated by reference. Suitable polyamides useful in the present invention can be formed by a condensation reaction of one or more polycarboxylic acids and one or more polyoxyalkylene amines. Methods for forming such polyamides are well known to those skilled in the art. If more information is needed, see C. Henkee et al., "Water Soluble Polyamides", *Antec '93* at pages 3446–3448; C. Henkee et al., "Control of Properties in Water Soluble Polyamides", Publication of Huntsman Corporation; Kirk-Othmer, *Encyclopedia of Chemical Technology*, (1968) Vol. 16 at pages 1–2 and *Encyclopedia of Polymer Science and Technology*. (1969) Vol. 10 at pages 483–597, which are hereby incorporated by reference.

"Condensation" means a chemical reaction in which two or more molecules combine with the separation of water,
alcohol or a simple substance. Hawley's at page 305, which is hereby incorporated by reference.

As used herein, the term "polycarboxylic acid" means an organic acid containing two or more carboxyl (—COOH) groups, and includes for example dicarboxylic acids, tricarboxylic acids and other polycarboxylic acids. See Hawley's at page 931, which is hereby incorporated by reference. Suitable polycarboxylic acids are preferably aliphatic, but the polycarboxylic acids can be aromatic and heterocyclic, if desired. The polycarboxylic acids can be saturated or unsaturated; and substituted or unsubstituted.

Non-limiting examples of suitable saturated aliphatic dicarboxylic acids include oxalic acid, malonic acid, succinic acid, glutaric acid, adipic acid, pimelic acid, suberic acid, azelaic acid, sebacic acid and dodecanedioic acid. Non-limiting example of suitable unsaturated aliphatic dicarboxylic acids include maleic acid, fumaric acid and itaconic acid. Examples of suitable aromatic dicarboxylic acids are phthalic acids, such as terephthalic acid and isophthalic acid. Non-limiting examples of suitable substituted aliphatic dicarboxylic acids include malic acid and tartaric acid.

A non-limiting example of a saturated aliphatic tricarboxylic acid useful in the present invention is tricarballylic acid. A non-limiting example of a substituted aliphatic tricarboxylic acid is citric acid.

Also useful in the present invention are dimer acids, which are high molecular weight dibasic dicarboxylic acids which are produced by dimerization of mixed unsaturated fatty acids, and similarly produced trimer acids which contain three carboxyl groups. See Hawley's at page 409 and *Encyclopedia of Polymer Science and Technology*, Vol. 1 at pages 110 and 115 (check). Preferably, the dimer acid is a $C_{36}$ dimer acid.

Suitable polyoxyalkylene amines can be formed by the reaction of ammonia, hydrogen and one or more polyoxyalkylene polyols in the presence of a catalyst. Non-limiting examples of suitable polyoxyalkylene polyols can be formed by the addition of alkylene oxides such as ethylene oxide, propylene oxides and mixtures thereof with a polyol such as ethylene glycol, propylene glycol or glycerol. See *Encyclopedia of Polymer Science and Technology*, (1967) Vol. 6 at pages 103–145. Methods of forming polyoxyalkylene amines are well known to those skilled in the art and further discussion thereof is not believed to be necessary. If more information is desired, see U.S. Pat. No. 3,654,370, which is hereby incorporated by reference.

Non-limiting examples of polyoxyalkylene amines suitable for use in the present invention include the JEFFAMINE® products which are commercially available from Huntsman Corporation of Austin, Tex. A non-limiting specific example of a suitable JEFFAMINE® product is EDR-148, which is a triethylene glycol diamine represented by the formula (I):

$$NH_2-(CH_2CH_2O)_2-CH_2CH_2NH_2 \qquad (I)$$

according to C. Henkee et al., "Water Soluble Polyamides", *Antec'93* at page 3447 and C. Henkee et al., "Control of Properties in Water Soluble Polyamides", Publication of Huntsman Corporation at page 3.

Another example of a suitable polyoxyalkylene amine is JEFFAMINE® EDR-192, which is a tetraethylene glycol diamine represented by formula (II):

$$NH_2-(CH_2CH_2O)_3-CH_2CH_2NH_2 \qquad (II)$$

according to C. Henkee et al., "Water Soluble Polyamides", *Antec '93* at page 3447.

Other suitable polyoxyalkylene amines include JEFFAMINE® ED-600, ED-900, ED-2001 and ED-6000, which are represented by formula (III):

in which a+c=3.5 and b=13.5 for ED-600, a+c=3.5 and b=20.5 for ED-900, a+c=3.5 and b=45.5 for ED-2001 and a+c=4 and b=132 for ED-6000, according to C. Henkee et al., "Water Soluble Polyamides", *Antec* '93 at page 3447.

Other useful polyoxyalkylene amines include polyoxypropylene diamines such as JEFFAMINE® D-230, D-400 and D-2000, which are represented by formula (IV):

in which x=2–3 for D-230, x=5–6 for D-400, and x=33 for D-2000, according to C. Henkee et al., "Control of Properties in Water Soluble Polyamides", Publication of Huntsman Corporation.

Suitable polyamides for use in the pre sent invention based upon the above JEFFAMINE® polyoxyalkylene amines and polycarboxylic acids are available from Huntsman Corporation. A preferred polyamide useful in the present invention is the reaction product of the polyoxyalkylene amine JEFFAMINE® EDR-148 (triethylene glycol diamine) and adipic acid.

Suitable polyamides can have a melting point of about 80° C. to about 250° C., and preferably about 100° C. to about 190° C.

Based upon the weight of the total solids of the sizing composition, the polyamide generally comprises about 5 to about 95 weight percent of the sizing composition. More typically, the polyamide comprises about 20 to about 80 weight percent, and preferably about 30 to about 70 weight percent of the sizing composition.

The sizing composition for the glass strands of the present invention comprises one or more acrylic polymers which are essentially free of epoxy functionality. As used herein, the phrase "acrylic polymer" means one or more polymers derived from acrylic acid, methacrylic acid and mixtures thereof, including copolymers and multipolymers. See Kirk-Othmer *Encyclopedia of Chemical Technology,* Vol. 1 (1963) at page 285, which is hereby incorporated by reference. The acrylic polymer is preferably water soluble, emulsifiable, dispersible and/or curable.

As used herein, the term "water soluble" means that the acrylic polymer is capable of being essentially uniformly blended and/or molecularly or ionically dispersed in water to form a true solution. See Hawley's *Condensed Chemical Dictionary,* (12th Ed. 1993) at page 1075, which is hereby incorporated by reference.

The term "emulsifiable" as used herein means that the acrylic polymer is capable of forming an essentially stable mixture or being suspended in water in the presence of an emulsifying agent. See Hawley's at page 461, which is hereby incorporated by reference. Non-limiting examples of suitable emulsifying agents are set forth below.

The term "dispersible" means that the acrylic polymer is capable of being distributed throughout water as finely divided particles, such as a latex. See Hawley's at page 435, which is hereby incorporated by reference. The uniformity of the dispersion can be increased by the addition of wetting, dispersing or emulsifying agents (surfactants), which are discussed below.

As used herein, the term "curable" means (1) the acrylic polymer is capable of being at least partially dried by air and/or heat; and/or (2) the acrylic polymer, other components of the sizing composition and/or glass fibers are capable of being crosslinked to each other to change the physical properties of the acrylic polymer. See Hawley's at page 331, which is hereby incorporated by reference.

The acrylic polymer is preferably self-crosslinking, for example by forming the acrylic polymer from acrylic monomers capable of internally crosslinking such as n-butoxymethacrylamide. External crosslinking agents can be included in the sizing composition for crosslinking the acrylic polymer with itself or other components of the coating composition, as discussed below. The acrylic polymer can be cationic, anionic or nonionic, but preferably is anionic.

The acrylic polymer can have hydroxy functionality for example by forming the acrylic polymer from hydroxyl functional monomers such as 2-hydroxyethyl acrylate (HEA) or 2-hydroxyethyl methacrylate (HEMA). The acrylic polymer is essentially free and preferably free of epoxy functionality, such as might be provided by including epoxy functional monomers in the monomer component such as polyglycidyl acrylates and polyglycidyl methacrylates as reactants for forming the acrylic polymer. The phrase "essentially free of epoxy functionality" means that the acrylic polymer has an epoxide equivalent weight of greater than about 1000, and preferably greater than about 10,000.

Preferably, the acrylic polymer has at least one acid functional group. As used herein, the phrase "acid functional" means that the acrylic polymer is is a substance that can give up a proton to a base in a chemical reaction; a substance that is capable of reacting with a base to form a salt; or a compound that produces hydronium ions, $H_3O^+$, in aqueous solution. See Hawley's at page 15 and K. Whitten et al., *General Chemistry,* (1981) at page 192, which are hereby incorporated by reference. Non-limiting examples of such acid groups include carboxyl groups or acyl groups, which can be neutralized with a base such as sodium hydroxide or preferably ammonium hydroxide. As used herein, the term "neutralize" means that the acrylic polymer and base have been reacted to attain the equivalence point. See Hawley's at page 815, which is hereby incorporated by reference. The equivalent weight of a base is the weight that will react with an equivalent weight of acid. The equivalent weight of the base depends upon the selected acrylic polymer to be neutralized. Such neutralization amounts and methods are well known to those skilled in the art and further discussion thereof is not believed to be necessary. A preferred acrylic polymer for use in the present invention is DISPEX™ A-40 polyacrylic acid which is neutralized with ammonium hydroxide, which is commercially available from Allied Colloids of Sussolk, Va. Other examples of polyacrylic acids useful in the present invention are VERSICOL™ E7, VERSICOL™ E9 and VERSICOL™ E11. which are commercially available from Allied Colloids.

The acrylic polymer can be prepared by vinyl addition polymerization of a monomer component comprising one or more acrylic monomers. Non-limiting examples of suitable acrylic monomers for forming the acrylic polymer include esters of acrylic acid and methacrylic acid, such as acrylates and methacrylates, including epoxy functional (meth) acrylates, acrylic anhydrides, acrylamides, acrylonitriles and derivatives and mixtures thereof.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably contain about 1 to about 18 carbon atoms. Non-limiting examples of alkyl esters include methyl (meth)acrylate, ethyl (meth) acrylates, propyl (meth)acrylates, butyl (meth)acrylates, pentyl (meth)acrylates, hexyl (meth)acrylates, heptyl (meth) acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth) acrylates and 2-ethylhexyl (meth)acrylate. Suitable hydroxyalkyl esters include 2-hydroxyethyl (meth)acrylate, 2-hydroxypropyl (meth)acrylate, 3-hydroxypropyl (meth) acrylate and hydroxybutyl (meth)acrylate.

Non-limiting examples of other useful acrylic monomers for forming the acrylic polymer include glycol acrylates such as ethylene glycol diacrylate, propylene glycol diacrylate, 1,3-propanediol acrylate, 1,4-butanediol acrylate, 1,4-butanediol methacrylate, 1,6-hexanediol diacrylate, neopentyl glycol diacrylate, 1,3-butyleneglycol diacrylate and tetraethylene glycol diacrylate. A useful polyol acrylate is trimethylolpropane triacrylate.

The acrylic polymer can be an acrylamide different from the polyacrylamide which is the reaction product of a polycarboxylic acid and polyoxyalkylene amine discussed above. Non-limiting examples of suitable acrylamides include methacrylamide, methylolacrylamide, and N-substituted derivatives thereof. Non-limiting examples of suitable acrylonitriles include acrylonitrile and methacrylonitrile.

In an alternative embodiment, the monomer component further comprises one or more vinyl addition polymerizable monomers different from the acrylic monomer. Non-limiting examples of addition polymerizable monomers which can be reacted with the acrylic monomer include other vinyl monomers such as vinyl aromatics including styrene, vinyl toluene, alpha methyl styrene, halostyrenes such as chlorostyrene, and vinyl napthalene; dienes including butadienes such as 1,3-butadiene and 2,3-dimethyl-1,3-butadiene; isoprene; and chloroprene; vinyl halides such as vinyl chloride and vinylidene chloride, vinyl acetates, block and graft copolymers thereof. Other useful addition polymerizable monomers include amides, such as n-methylol (meth)acrylamide; nitriles; pyrrolidones and olefins such as ethylene. Mixtures of any of the above addition polymerizable monomers are also useful. Preformed polymers of these monomers can also be addition polymerized with the acrylic polymer provided the preformed polymer has addition polymerizable unsaturation. Examples of such copolymers believed to be useful in the present invention are n-methylolacrylamide vinyl acetate copolymers and VINOL® vinyl acetate products which are commercially available from Air Products and Chemicals, Inc. of Allentown, Pa.

Methods for polymerizing acrylic monomers with themselves and/or other addition polymerizable monomers and preformed polymers are well known to those skilled in the art of polymers and further discussion thereof is not believed to be necessary in view of the present disclosure. For example, polymerization of the acrylic monomer can be carried out in bulk, in aqueous or organic solvent solution such as benzene or n-hexane, in emulsion, or in aqueous dispersion. Kirk-Othmer, Vol. 1 at page 305. The polymerization can be effected by means of a suitable initiator system, including free radical initiators such as benzoyl peroxide or azobisisobutyronitrile, anionic initiation, and organometallic initiation. Molecular weight can be controlled by choice of solvent or polymerization medium, concentration of initiator or monomer, temperature, and the use of chain transfer agents. If additional information is needed, such polymerization methods are disclosed in Kirk-Othmer, Vol. 1 at pages 203–205, 259–297 and 305–307, which are hereby incorporated by reference.

The number average molecular weight (Mn), as determined by gel permeation chromatography, of the acrylic polymer can be about 200 to about 6,000,000 and is preferably about 8,000 to about 500,000. The glass transition temperature of the acrylic polymer can be about −40° C. to about 100° C., preferably about −30° C. to about 80° C., and more preferably about −25 to about +45 as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

Other examples of useful acrylic polymers include Fulatex® materials which are commercially available from H. B. Fuller Co. of St. Paul, Minn. Useful FULATEX® materials including FULATEX® PN-3716G, which includes about 42 weight percent butyl acrylate and about 58 weight percent styrene, and FULATEX® PN-3716L. Another useful acrylic polymer is FULATEX® PN-3716K, which has a glass transition temperature of about 26° C., about 44 to about 46 weight percent solids, a pH of about 2.0 to about 3.5, a viscosity of about 10 to about 200 centipoise (measured using Brookfield Viscometer Model RVF at 20 revolutions per minute (rpm) at 25° C.). See PN-3716-K Technical Data Sheet of H. B. Fuller Co. (Jul. 25, 1994), which is hereby incorporated by reference. Other useful FULATEX® materials include FULATEX® PN-3716F, FULATEX® PN-3716H and FULATEX® PN-3716J.

Other useful acrylic polymers include self-crosslinking acrylic emulsions such as RHOPLEX® emulsions commercially available from the Rohm & Haas Company. See "Building Better Nonwovens", a Technical Bulletin of Rohm and Haas Specialty Industrial Polymers, (1994), which is hereby incorporated by reference.

An example of a useful acrylic polymer is RHOPLEX® TR-407 which is an anionic self-crosslinking emulsion and has a T300 of +30, is milky white in appearance, has 45.5 percent solids, a Brookfield LVF viscosity at 25° C. of 30 cp (No. 1 spindle, 60 RPM), a pH of 4.0, a glass transition temperature of about 34° C. and a density of 8.7 lb./gal. "Building Better Nonwovens" at page 7.

RHOPLEX® E-32 nonionic self-crosslinking acrylic emulsion has a pH of about 2.6, a density of about 8.8 lb./gallon at 25° C., a glass transition temperature of about 5° C. and a viscosity of 200 centipoise (measured on a Brookfield viscometer, #1 spindle at 12 revolutions per minute (rpm)) is also a suitable acrylic for use in the present invention. "Building Better Nonwovens" at page 7.

Other examples are RHOPLEX® HA-8, HA-12 and HA-16 self-crosslinking acrylic emulsions. RHOPLEX® HA-8 is nonionic, has a T300 of −14° C., is a milky-white liquid, has about 45.5 percent solids, a Brookfield LVF viscosity of about 550 cp (No. 3 spindle, 60 rpm), a pH of about 3.0, and a density of about 8.7 lb./gallon at 25° C. "Chemicals For The Textile Industry", page 2, a Technical Bulletin of Rohm and Haas Company (November 1977) and "RHOPLEX® HA-8, RHOPLEX® HA-12, RHOPLEX® HA-16", page 2, a Technical Bulletin of Rohm and Haas Company (January 1978), which are hereby incorporated by reference.

Another suitable acrylic latex is RHOPLEX® WL-81 acrylic latex, which is a thermoplastic acrylic polymer with approximately 40 percent solids, a Brookfield viscosity of 40 to 500 cp at 25° C. (No. 2 spindle, 30 rpm), a T300 of 60° C., a specific gravity of 1.036 and a pH of 7.5.

An additional example of a suitable acrylic latex is RHOPLEX® E-693 emulsion, which is a self-crosslinking acrylic polymer having a milky white liquid appearance with an anionic emulsifying system, a solids content of 50 percent, a pH of 5.5, a density at 25° C. of 8.8 lbs./gal, and a minimum film-forming temperature of 12° C., and a T300 of 24° C.

Also useful are the CARBOSET acrylic polymers which are commercially available from B.F. Goodrich Co. of Toledo, Ohio.

Another suitable acrylic latex is an acrylonitrile butadiene copolymer such as is commercially available from B.F. Goodrich Chemical Co. under the trade designation of HYCAR G-17.

Yet another suitable acrylic is a self-crosslinking ethylene acrylic acid copolymer. Specific examples of useful EM copolymer dispersions are MICHEM® PRIME 4990 or MICHEM® PRIME 4983HS available from Michelman Inc. of Cincinnati, Ohio.

The amount of the acrylic polymer can be about 20 to about 80 weight percent of the aqueous secondary coating composition on a total solids basis, preferably about 30 to about 70 weight percent, and more preferably about 40 to about 60 weight percent.

The sizing composition for the glass fiber strands of the present invention comprises one or more fiber lubricants which are different from the polyamide. Useful fiber lubricants include cationic, non-ionic or anionic lubricants and mixtures thereof. Generally, the amount of fiber lubricant can be about 0.5 to about 15 weight percent of the sizing composition on a total solids basis, preferably about 1 to about 12 weight percent, and more preferably about 2 to about 8 weight percent.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KET JENLUBE 522 partially carboxylated polyester which is commercially available from Akzo Chemicals, Inc. of Chicago, Ill. and Protolube HD high density polyethylene emulsion which is commercially available from Sybron Chemicals of Birmingham, N.J.

The sizing composition also comprises one or more coupling agents selected from the group consisting of organo silane coupling agents, transition metal coupling agents, amino-containing Werner coupling agents and mixtures thereof. These coupling agents typically have dual functionality. Each metal or silicon atom has attached to it one or more groups which can react or compatibilize with the glass fiber surface and/or the components of the sizing composition. As used herein, the term "compatibilize" means that the groups are chemically attracted, but not bonded, to the glass fiber surface and/or the components of the sizing composition, for example by polar, wetting or solvation forces. Examples of hydrolyzable groups include:

the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include 3-aminopropyldimethylethoxysilane, gamma-aminopropyltriethoxysilane, gamma-aminopropyltrimethoxysilane, beta-aminoethyltriethoxysilane, N-beta-aminoethyl-aminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane.

Non-limiting examples of useful functional organo silane coupling agents include epoxy (A-187 gamma-glycidoxypropyltrimethoxysilane), methacrylate (A-174 gamma-methacryloxypropyltrimethoxysilane) and amino (A-1100 gamma-aminopropyltriethoxysilane) silane coupling agents (preferred), each of which are commercially available from OSi Specialties, Inc. of Tarrytown, N.Y. The organo silane coupling agent can be at least partially hydrolyzed with water prior to application to the glass fibers, preferably at about a 1:1 stoichiometric ratio or, if desired, applied in unhydrolyzed form.

Suitable transition metal coupling agents include titanium, zirconium and chromium coupling agents. Non-limiting examples of suitable titanate coupling agents include titanate complexes such as Ken-React KR-44, KR-34 and KR-38; suitable zirconate coupling agents include Ken React NZ-97 and LZ-38, all of which are commercially available from Kenrich Petrochemical Company. Suitable chromium complexes include Volan which is commercially available from E.I. duPont de Nemours of Wilmington, Del. The amino-containing Werner-type coupling agents are complex compounds in which a trivalent nuclear atom such as chromium is coordinated with an organic acid having amino functionality. Other metal chelate and coordinate type coupling agents known to those skilled in the art can be used herein.

The amount of coupling agent can be 1 to about 25 weight percent of the sizing composition on a total solids basis, and is preferably about 4 to about 12 weight percent.

The sizing composition is preferably essentially free of a urethane-containing polymer. The phrase "essentially free of a urethane-containing polymer" as used herein means that the sizing composition contains less than about 5 weight percent of a urethane-containing polymer on a total solids basis, preferably less than about 2 weight percent, and most preferably the sizing composition is free of a urethane-containing polymer.

The phrase "urethane-containing polymer" as used herein means any polymer containing one or more units of the structure (I):

See Kirk-Othmer, Vol. 21 at pages 56–69, which are hereby incorporated by reference. As noted in Kirk-Othmer, Vol. 21 at page 57, the terms urethane and polyurethane are commonly used to refer to urethan and polyurethan, respectively. As used herein, the terms "urethane" and "polyurethane" are used to refer to "urethan" and "polyurethan", respectively. Such urethane-containing polymers can be thermoplastic or thermosetting, and either water soluble, or emulsifiable or dispersible with the use of an emulsifying or dispersing agent.

Urethane-containing polymers are typically condensation products of a polyisocyanate material and a hydroxyl-containing material such as polyether polyol or polyester polyol and include, for example, WITCOBOND® W-290H thermoplastic polyurethane which is commercially available from Witco Chemical Corp. of Chicago, Ill. and RUCO-THANE® 2011L polyurethane latex, which is commercially available from Ruco Polymer Corp. of Hicksville, N.Y.

Examples of thermosetting polyurethanes include BAY-BOND XW-110, which is commercially available from Bayer and other thermosetting polyurethanes which are commercially available from Bayer and E.I. duPont de Nemours Co. of Wilmington, Del.

The sizing composition is preferably essentially free of an epoxy material. The phrase "essentially free of an epoxy material" as used herein means that the sizing composition contains less than about 5 weight percent of an epoxy material on a total solids basis, preferably less than about 3 weight percent, and most preferably the sizing composition is free of an epoxy material.

The phrase "epoxy material" as used herein means any material containing at least one epoxy or oxirane group in the molecule, such as polyglycidyl ethers of polyhydric alcohols or thiols. Polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide.

Non-limiting examples of aromatic polyhydric alcohols include phenols; dihydroxybenzenes, for example resorcinol, pyrocatechol and hydroquinone; bis(4-hydroxyphenyl)-1,1-isobutane; 4,4'-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof.

Examples of commercially available epoxy materials are EPON® 826 and 828 epoxy resins, which are epoxy functional polyglycidyl ethers of bisphenol A prepared from bisphenol-A and epichlorohydrin and are commercially available from Shell Chemical.

The sizing composition can further comprise one or more film-forming materials different from the components discussed above, such as thermoplastic materials, thermosetting materials and mixtures thereof.

Examples of the thermoplastic and thermosetting film-forming materials include aminoplasts, alkyds, phenolics, polyolefins, polyesters, vinyl polymers, derivatives and mixtures thereof, to name a few.

Useful aminoplasts include urea-formaldehyde and melamine formaldehyde such as Resimene 841 which is commercially available from Monsanto Co. of St. Louis, Mo. A non-limiting example of a phenolic suitable for use in the present invention is phenol formaldehyde.

Non-limiting examples of useful polyolefins include polypropylene and polyethylene materials such as the polypropylene emulsion RL-5440, which is commercially available from Sybron Chemicals of Birmingham, N.J., and Polyemulsion Chemcor 43C30, which is commercially available from Chemical Corp. of America. Another example of a suitable polyolefin for use in the present invention is the high density polyethylene emulsion Protolube HD which is commercially available from Sybron Chemicals of Birmingham, N.J.

Non-limiting examples of useful polyester materials include RD-847A polyester resin which is commercially available from Borden Chemicals of Columbus, Ohio. Other suitable polyesters are Stypol polyesters which are commercially available from Cook Composites and Polymers of Port Washington, Wis. and Neoxil polyesters which are commercially available from Savid S.p.A. of Como, Italy.

Thermoplastic polyesters useful in the present invention include ethylene adipates (such as Desmophen 2000) and ethylene butylene adipates (such as Desmophen 2001 KS), both of which are commercially available from Bayer of Pittsburgh, Pa.

Non-limiting examples of useful vinyl polymers include Resyn 2828 and Resyn 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

The amount of film-forming material can be about 1 to about 20 weight percent of the sizing composition on a total solids basis, and preferably about 1 to about 5 weight percent.

Crosslinking materials, such as the aminoplasts discussed above, can also be included in the sizing composition. Non-limiting examples of suitable crosslinkers include melamine formaldehyde, blocked isocyanates such as Baybond XW 116 or XP 7055, epoxy crosslinkers such as Witcobond XW by Witco Corp., and polyesters such as Baybond XP-7044 or 7056. The Baybond products are commercially available from Bayer of Pittsburgh, Pa. The amount of crosslinker can be about 1 to about 25 weight percent of the sizing composition on a total solids basis.

The sizing composition can include one or more emulsifying agents for emulsifying components of the sizing composition, such as the acrylic polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

Examples of suitable polyoxypropylene-polyoxyethylene copolymers are SYNPERONIC F-108 and PLURONIC™ F-108, which is commercially available from BASF Corporation of Parsippany, N.J.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanols are IGEPAL CA-630 from GAF Corporation of Wayne, N.J.

An example of a polyoxyethylated vegetable oil is EMULPHOR EL719, which is commercially available from GAF Corp. A useful polyoxyethylene octylphenyl glycol ether is Triton X-100, which is commercially available from Rohm & Haas of Philadelphia, Pa. Tween 21 and 81 are examples of useful ethylene oxide derivatives of sorbitol esters.

Other examples of suitable emulsifying agents include non-ionic epoxide polyols such as NOVEPOX™ or Prox E 117, which are commercially available from Synthron, Inc.

Generally, the amount of emulsifying agent can be about 0.01 to about 20 weight percent of the sizing composition on a total solids basis, and is more preferably about 0.1 to about 10 weight percent.

Fungicides, bactericides and anti-foaming materials can also be included in the sizing composition. A wide variety of materials are suitable for this purpose. Examples of suitable bactericides include potassium cyanide and Biomet 66 antimicrobial compound, which is commercially available from M & T Chemicals of Rahway, N.J. Suitable anti-foaming materials are the SAG materials which are commercially available from OSi Specialties, Inc. of Danbury, Conn. The amount of fungicide or bactericide can be about $\times 10^{-4}$ to about 5 weight percent of the sizing composition on a total solids basis.

The sizing composition can further comprise one or more organic and/or inorganic acids or bases in an amount sufficient to provide the aqueous sizing composition with a pH of about 4 to about 11, preferably about 6 to about 9. Non-limiting examples of organic acids suitable for use in the present invention include mono- and polycarboxylic acids and/or anhydrides thereof, such as acetic, citric, formic, propionic, caproic, lactic, benzoic, pyruvic, oxalic, maleic, fumaric, acrylic, methacrylic acids and mixtures thereof. A non-limiting example of a suitable inorganic acid is hydrochloric acid. Non-limiting examples of suitable bases include alkali metal hydroxides, alkali metal carbonates and ammonium hydroxide.

The sizing composition can include one or more aqueous soluble, emulsifiable or dispersible wax materials to increase lubricity. The wax material can be selected from vegetable, animal, mineral, synthetic or petroleum waxes, for example. Suitable commercially available petroleum waxes are, for example, MICHEM® LUBE 296 microcrystalline wax, POLYMEKON® SPP-W microcrystalline wax and PETROLITE 75 microcrystalline wax which are available from Michelman Inc. of Cincinnati, Ohio and the Petrolite Corporation of Tulsa, Okla., respectively. Generally, the amount of wax can be about 1 to about 10 weight percent of the sizing composition on a total solids basis, and preferably about 3 to about 5 weight percent.

The sizing composition can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer can be about 5 to about 15 weight percent of the coating composition on a total solids basis, and is more preferably about 5 to about 10 weight percent.

The sizing composition can include an optical brightener (fluorescent whitening agent or brightening agent) which typically absorb the invisible ultraviolet portion of the daylight spectrum between about 300 and 400 nanometers and converts this energy into longer wavelength visible portion of the spectrum between about 400 and 500 nanometers. Non-limiting examples of suitable optical brighteners include bisbenzoxazoles such as EASTOBRITE® OB-1 and EASTOBRITE® OB-3, which are commercially available from Eastman Chemical Co. of Kingsport, Tenn. These materials are commercially available in aqueous emulsions as AQUASTAB® products which are commercially available from Eastman Chemical Co. Other useful optical brighteners include UVITEX® products which are commercially available from Ciba-Geigy Corp. of Greensboro, N.C. The amount of optical brightener can be about 0.05 to about 5 weight percent of the total solids of the sizing composition.

The sizing composition can include antioxidants, such as propionates, sulfur-containing materials, phosphorus-containing materials, hindered phenols, diaryl amines and thioethers. The amount of antioxidant can be about 1 to about 25 weight percent of the total solids of the sizing composition.

Examples of useful propionates include Irganox™ 1010 and Irganox™ 1076, which are commercially available from Ciba-Geigy Corp. of Greensboro, N.C.

Examples of useful sulfur-containing materials include Anoxsyn 442, which is a bis alkyl sulfide commercially available from Atochem N.A. of Philadelphia, Pa., and distearylthiodipropionate (DSTDP).

Non-limiting examples of phosphorus-containing antioxidant materials include phosphites such as sodium hypophosphite, Irganox™ B215 and Irganox™ 168, which are commercially available from Ciba-Geigy Corp., and Ultranox 626 which is commercially available from GE Specialty Chemicals.

Examples of ultraviolet light stabilizers useful in the present invention include hindered-amine light stabilizers (HALS) such as are available from Atochem. The amount of ultraviolet light stabilizer can be about $1 \times 10^{-4}$ to about 10 weight percent of the total solids of the sizing composition.

Useful colorants or pigments include Ultramarine Blue which is commercially available from Whittaker Chemical. The amount of colorant can be about $\times 10^{-4}$ to about 10 weight percent of the total solids of the sizing composition.

Examples of antistatic agents useful in the present invention include Larostat 264 alkyl dipolyoxyethylene ethyl ammonium ethyl sulfate which is commercially available from PPG Industries, Inc. of Pittsburgh, Pa. The amount of antistatic agent can be about $1 \times 10^{-4}$ to about 10 weight percent of the sizing composition on a total solids basis.

The sizing composition can also include nucleating agents such as sodium benzoate and impact modifiers or elastomers such as natural or synthetic rubbers. The amounts of these other additives can be about 0.01 to about 25 weight percent of the sizing composition.

Water (preferably deionized) is included in the sizing composition in an amount sufficient to facilitate application of a generally uniform coating upon the strand. The weight percentage of solids of the sizing composition generally can be about 1 to about 25 weight percent. Preferably, the weight percentage of solids is about 2 to about 15 weight percent and, more preferably, about 4 to about 10 weight percent. Although not preferred, it should be understood that minor amounts of water miscible or water soluble organic solvents can be included in the sizing composition, so long as the essential characteristics of the sizing composition are not adversely affected.

The sizing composition of the present invention can be prepared by any suitable method such as conventional mixing well known to those of skilled in the art. For example, the acrylic polymer is formed by addition polymerization of the monomer component. The acrylic polymer, fiber lubricant and polyamide are preferably diluted or dissolved in deionized water before mixing with the other components. The coupling agent is preferably at least partially hydrolyzed prior to mixing with the other components of the sizing composition.

The sizing composition is applied to at least a portion of the surface of the glass fibers of the strand. Glass fibers are a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, *The Manufacturing Technology of Glass Fibres,* (3d Ed. 1993) at pages 30–44, 47–60, 115–122 and 126–135, which are hereby incorporated by reference.

The sizing can be applied in many ways, for example by contacting the filaments with a static or dynamic applicator, such as a roller or belt applicator, spraying or other means. See Loewenstein (3d Ed.) at pages 165–172, which is hereby incorporated by reference.

The sized fibers can be dried to form a dried residue 18 of the sizing composition upon the fibers prior to any subsequent processing steps or the sized fibers can be chopped while wet and subsequently dried. The sized fibers are preferably dried at room temperature or at elevated temperatures. Drying of glass fiber forming packages or cakes is discussed in detail in Loewenstein (3d Ed.) at pages 219–222, which are hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass fibers will depend upon such variables as the percentage of solids in the sizing composition, components of the sizing composition and type of glass fiber. The sizing composition is typically present on the fibers in an amount between about 0.1 percent and about 5 percent by weight after drying.

Suitable ovens or dryers for drying glass fibers are well known to those skilled in the art. The dryer removes excess moisture from the fibers and, if present, cures any curable sizing or secondary coating composition components.

After drying, the sized glass strands can be further processed by twisting into a yarn, chopping, combination in parallel to form a bundle or roving, weaving into a cloth or forming into a chopped or continuous strand mat, as discussed above. The sized glass strands can be further treated with a secondary coating composition which is different from the sizing composition. The secondary coating composition can include one or more of the components of the sizing composition discussed above, and is preferably aqueous-based.

The glass fiber strands can be used in a wide variety of applications, but are preferably used as reinforcements for reinforcing polymeric matrix materials, such as polymeric thermoplastic materials and polymeric thermosetting materials.

Non-limiting examples of suitable polymeric thermoplastic materials include polyolefins, polyamides, thermoplastic polyurethanes, thermoplastic polyesters, vinyl polymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene, neoprene and polyketones such as Carilon® which is commercially available from Shell Chemical Co.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12. Useful nylons are commercially available from DuPont. Other examples of useful polyamides include polyhexamethylene adipamide and aramids such as Kevlar™, which is commercially available from E.I. duPont de Nemours and Company of Wilmington, Del. Nylon is the preferred polymeric matrix material.

Suitable thermoplastic polyurethanes are condensation products of a polyisocyanate material and a hydroxyl-containing material such as polyol and include, for example, Estane and Texin polyurethanes which are commercially available from B.F. Goodrich of Toledo, Ohio and Bayer, respectively.

Thermoplastic polyesters useful in the present invention include polyethylene terephthalate, polybutylene terephthalate and polypropylene terephthalate.

Useful vinyl polymers include polyvinyl chloride, polyvinylidene chloride (saran), polyvinyl fluoride, polyvinylidene fluoride, ethylene vinyl acetate copolymers, such as Elvax which is commercially available from duPont, and polystyrenes such as Dylark which is a maleic anhydride-modified styrene which is commercially available from Arco Chemical of Newtown Square, Pa.

Thermoplastic elastomeric materials useful as matrix materials in the present invention include styrene-butadiene rubbers, styrene-acrylontrile (SAN) copolymers such as Lustran, which is commercially available from Monsanto of St. Louis, Mo., styrene-butadiene-styrene (SBS) copolymers and acrylonitrile-butadiene-styrene (ABS) copolymers, such as Cycolac or Blendex, which are commercially available from GE Plastics of Pittsfield, Mass.

Further examples of useful thermoplastic materials include polyimides including polyether imides such as Ultem, which is commercially available from GE Plastics; polyether sulfones, such as Victrex which is commercially available from ICI Americas, Inc. of Wilmington, Del.; polyphenyl sulfones such as Radel R which is believed to be commercially available from Amoco; polyetherketones including polyetheretherketones (PEEK) such as Ultra Pec, which is commercially available from BASF Corp. of Parsippany, N.J.; polyphenylene oxides such as Noryl, which is commercially available from G.E. Plastics; polyphenylene sulfides such as Ryton R which is commercially available from Phillips Chemical Co. of Houston, Tex.; polyacetals such as Celcon, which is commercially available from Hoechst Celanese Corp. of Chatham, N.J.; polyvinyl chlorides; and polycarbonates such as Lexan, which is commercially available from G.E. Plastics, and Makrolon, which is commercially available from Bayer. Also included as suitable thermoplastic materials are any of the above thermoplastics which are modified by an unsaturated monomer.

Matrix materials useful in the present invention can include thermosetting materials such as thermosetting polyesters, vinyl esters, epoxides, phenolics, aminoplasts, thermosetting polyurethanes, derivatives and mixtures thereof.

Suitable thermosetting polyesters include the AROPOL products which are commercially available from Ashland Chemical Inc. of Columbus, Ohio. Examples of useful vinyl esters include Derakane® products such as Derakane® 470-45, which are commercially available from Dow Chemical USA of Midland, Mich.

Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin, which is believed to be preferred. Suitable polyhydric alcohols can be aromatic, aliphatic or cycloaliphatic. Non-limiting examples of aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1 5-hydroxynaphthalene; 4-isopropylidene bis(2,6-dibromophenol); 1,1,2,2-tetra(p-hydroxy phenyl)-ethane; 1,1,3-tris(phydroxy phenyl)-propane; novolac resins; bisphenol F; long-chain bisphenols; and 4,4'-isopropylidenediphenol, i.e., bisphenol A. Bisphenol A is a particularly useful polyhydric alcohol.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof. An example of a suitable cycloaliphatic alcohol is cyclohexanedimethanol.

Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical. Other examples of useful epoxy film-forming polymers are set forth in U.S. Pat. No. 4,752,527 of Sanzero et al., which is hereby incorporated by reference.

Non-limiting examples of suitable phenolics include phenolformaldehyde and Resimene 841 melamine formaldehyde from Monsanto. Useful aminoplasts include urea-formaldehyde and melamine formaldehyde. Suitable thermosetting polyurethanes include Baybond XW-110, which is commercially available from Bayer and other thermosetting polyurethanes which are commercially available from Bayer and E.I. duPont de Nemours Co. of Wilmington, Del.

Other components which can be included with the polymeric matrix material and reinforcing material in the composite are, for example, colorants or pigments, lubricants or process aids, ultraviolet light (UV) stabilizers, antioxidants, other fillers, and extenders.

The amount of glass fiber strand included in the composite is preferably less than about 65 weight percent of the total weight of the composite, and more preferably less than about 45 weight percent.

The reinforcing material can be dispersed in the matrix by hand or any suitable automated feed or mixing device which distributes the reinforcing material generally evenly throughout the polymeric matrix material. For example, the reinforcing material can be dispersed in the polymeric matrix material by dry blending all of the components concurrently or sequentially. Alternatively, the reinforcing material can be fed as a continuous strand into a melt impregnation die, pultruded, cut and molded.

The sized glass fiber strand 10 and the polymeric matrix material 20 can be formed into a composite 12 by a variety of methods which are dependent upon such factors as the type of polymeric matrix material used. Thermosetting polymeric matrix materials can be cured by the inclusion of crosslinkers in the matrix material and/or by the application of heat, for example. Suitable crosslinkers useful to crosslink the polymeric matrix material are discussed above. The temperature and curing time for the thermosetting polymeric matrix material depends upon such factors as the type of polymeric matrix material used, other additives in the matrix system and thickness of the composite, to name a few.

Reinforced polymeric composites can be formed from the polymeric matrix material, reinforcing material and any other desired components in a variety of ways. For example, for a thermosetting matrix material, the composite can be formed by compression or injection molding, pultrusion, filament winding, hand lay-up, spray-up or by sheet molding or bulk molding followed by compression or injection molding. For a thermoplastic matrix material, suitable methods for forming the composite include direct molding or extrusion compounding followed by injection molding. Useful extrusion equipment includes single or twin screw extruders commercially available from Werner & Pfleiderer as Model No. ZSK 30 and Welding Engineers, respectively. Methods and apparatus for forming the composite by the above methods is discussed in *Handbook of Plastic Materials and Technology* at pages 955–1062, 1179–1215 and 1225–1271, which are hereby incorporated by reference.

The method according to the present invention for reinforcing a polymeric matrix material comprises: (1) applying to a glass fiber strand reinforcing material the above sizing composition; (2) at least partially drying the sizing composition to form a substantially uniform coating upon the reinforcing material; (3) dispersing the reinforcing material in the polymeric matrix material; and (4) at least partially curing the polymeric matrix material to provide a reinforced polymeric composite in a manner such as is discussed in detail above. In addition, the method can comprise the step of at least partially drying the sized fiber strand prior to the step of applying the secondary coating composition.

The present invention will now be illustrated by the following specific, non-limiting example.

EXAMPLE

Each of the components in the amounts set forth in Table 1 were mixed to form an aqueous sizing composition (Sample A) according to the present invention.

TABLE 1

| COMPONENT | WEIGHT PERCENTAGE OF COMPONENT |
|---|---|
| polyamide[1] | 2.70 |
| acrylic polymer[2] | 9.30 |
| fiber lubricant[3] | 0.18 |
| A-1100 silane[4] | 0.56 |
| water | 87.26 |

[1]The polyamide used to prepare this sample is commercially available from Huntsman Corporation of Austin, Texas as the reaction product of adipic acid and JEFFAMINE ® EDR-148 at a 1:1 molar ratio.
[2]The acrylic polymer used to prepare this sample was DISPEX ™ A-40 polyacrylic acid which was neutralized with ammonium hydroxide, which is commercially available from Allied Colloids of Sussolk, Virginia.
[3]EMERY ® 6760 partially amidated polyethylene imine fiber lubricant which is commercially available from Emery Henkel Corporation of Kankakee, Illinois.
[4]A-1100 is a gamma-aminopropyltriethoxysilane which is commercially available from OSi Specialties, Inc. of Danbury, Connecticut. The A-1100 was hydrolyzed with water and the pH adjusted with acetic acid prior to mixing with the other components.
[5]The fiber glass strand was sized with an aqueous sizing composition containing about 36% Neoxil 9851 polyester-based polyurethane, about 55% DISPEX ™ A-40 polyacrylic acid, about 5% A-1100 coupling agent, about 2% Emery 6760 fiber lubricant and about 2% Synperonic F-108 block copolymer of propylene oxide and ethylene oxide.

The percent solids of the aqueous sizing composition was about 7.08 and the pH was about 8.5. The aqueous sizing composition was applied in a conventional forming process to 205 tex, 10 micrometer average filament diameter E-glass fibers and dried to form glass fiber strand having a loss on ignition (LOI) of about 0.82 percent. The strands were direct chopped into about 4.5 millimeter lengths. A control sample[5] was similarly prepared.

Composites of the glass strands of the Control and Sample A were compounded at about 30 weight percent glass content with AKULON™ K124 Nylon 6, which is commercially available from DSM of the Netherlands, and ULTRAMID® A3 Nylon 66 which is commercially available from BASF Corp. using a Werner & Pfleiderer ZSK 30 millimeter twin screw extruder and molded using a Battenfeld Model 750/315CD injection molding machine. The samples were prepared for the evaluation of physical properties according to the following ISO specifications: for Charpy impact strength—ISO 179; for Izod impact strength—ISO 180; for tensile properties—ISO 527; and for flexural properties—ISO 178. The samples were also evaluated for color using a Dr. Lange colorimeter. The results of the physical property testing are set forth in Table 2 below.

TABLE 2

| | NYLON 6 | | NYLON 66 | |
|---|---|---|---|---|
| PHYSICAL PROPERTY | CONTROL | SAMPLE A | CONTROL | SAMPLE A |
| CHARPY | | | | |
| Unnotched impact strength (kJ/m²) | 93 | 91 | 85 | 87 |
| Notched impact strength (kJ/m²) | 18.1 | 17.3 | 12.6 | 11.2 |
| IZOD | | | | |
| Unnotched impact strength (kJ/m²) | 88 | 89 | 77 | 70 |
| Notched impact strength (kJ/m²) | 18.0 | 16.6 | 14.0 | 11.0 |
| Tensile strength (MPa) | 177 | 171 | 191 | 181 |
| Tensile Modulus (GPa) | 9.2 | 9.5 | 9.5 | 9.4 |
| Elongation at break (%) | 4.6 | 4.4 | 3.8 | 3.5 |
| Flexural Strength (MPa) | 280 | 273 | 293 | 273 |
| Flexural Modulus (GPa) | 8.7 | 8.6 | 8.8 | 8.5 |
| Outer fiber strain at break (%) | 5.1 | 5.0 | 4.6 | 4.5 |
| COLOR | | | | |
| L* | 62.54 | 61.91 | 65.35 | 64.51 |
| a* | −3.85 | −3.74 | −3.65 | −3.81 |
| b* | 4.86 | 5.65 | 9.39 | 9.40 |
| Y! | 8.66 | 10.85 | 19.32 | 19.39 |
| W! | 18.13 | 15.63 | 8.68 | 8.05 |

As shown in Table 2, the physical properties for test samples of glass fibers coated with a sizing composition according to the present invention (Sample A) are comparable to those of the Control for composites formed using Nylon 6 and Nylon 66 matrix material. The glass fibers coated with a sizing composition according to the present invention contain a polyamide which is the reaction product of a polycarboxylic acid and a polyoxyalkylene amine, rather than a polyurethane which is used in the sizing composition coating the control glass fibers.

From the foregoing description, it can be seen that the present invention comprises coated glass fibers which provide less expensive, simplified reinforcement for composites formed from thermosetting and thermoplastic polymers, such as nylon, while providing adequate physical properties. Such coated glass fibers can be used in a number of applications in which strength, modulus and impact resistance are needed.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A glass fiber strand adapted to reinforce a polymeric matrix material, the strand having thereon a sizing composition comprising:
   (a) a polyamide which is the reaction product of (1) a polycarboxylic acid and (2) a polyoxyalkylene amine;
   (b) an acrylic polymer which is essentially free of epoxy functionality;
   (c) a coupling agent selected from the group consisting of organo silane coupling agents, transition metal coupling agents, amino-containing Werner coupling agents and mixtures thereof; and
   (d) a fiber lubricant which is different from the polyamide of (a), the sizing composition being essentially free of a urethane-containing polymer.

2. The glass fiber strand according to claim 1, wherein the sizing composition is present as a dried residue upon at least a portion of a surface of the strand.

3. The glass fiber strand according to claim 1, wherein the polycarboxylic acid of the polyamide (a) is a dicarboxylic acid.

4. The glass fiber strand according to claim 3, wherein the dicarboxylic acid is selected from the group consisting of oxalic acid, malonic acid, succinic acid, glutaric acid, adipic acid, pimelic acid, suberic acid, azelaic acid, sebacic acid, maleic acid, fumaric acid, itaconic acid, phthalic acid, malic acid and tartaric acid.

5. The glass fiber strand according to claim 1, wherein the polyoxyalkylene amine of the polyamide (a) is selected from the group consisting of triethylene glycol diamine, tetraethylene glycol diamine and polyoxypropylene diamines.

6. The glass fiber strand according to claim 1, wherein the polyamide comprises about 5 to about 95 weight percent of the sizing composition on a total solids basis.

7. The glass fiber strand according to claim 1, wherein the acrylic polymer of the sizing composition is prepared by vinyl addition polymerization of a monomer component comprising an acrylic monomer.

8. The glass fiber strand according to claim 6, wherein the acrylic monomer of the monomer component is selected from the group consisting of acrylic acid, methacrylic acid, alkyl esters of acrylic acid, alkyl esters of methacrylic acid, acrylic anhydrides, acrylamides, acrylonitriles, derivatives thereof and mixtures thereof.

9. The glass fiber strand according to claim 7, wherein the monomer component of the acrylic polymer further comprises a vinyl addition polymerizable monomer different from the acrylic monomer.

10. The glass fiber strand according to claim 9, wherein the vinyl addition polymerizable monomer is selected from the group consisting of vinyl aromatics, dienes, vinyl halides, vinyl acetates, amides, nitriles, pyrrolidones, olefins and mixtures thereof.

11. The glass fiber strand according to claim 1, wherein the acrylic polymer is a homopolymer of acrylic acid.

12. The glass fiber strand according to claim 11, wherein the acrylic acid polymer has at least one acid functional group which is neutralized with ammonium hydroxide.

13. The glass fiber strand according to claim 1, wherein the acrylic polymer comprises about 20 to about 80 weight percent of the sizing composition on a total solids basis.

14. The glass fiber strand according to claim 1, wherein the coupling agent is an amino organo silane coupling agent.

15. The glass fiber strand according to claim 1, wherein the fiber lubricant is a cationic fiber lubricant which is selected from the group consisting of amine salts of fatty acids, alkyl imidazoline derivatives, acid solubilized fatty acid amides and mixtures thereof.

16. The glass fiber strand according to claim 1, wherein the sizing composition is essentially free of an epoxy material.

17. The glass fiber strand according to claim 1, wherein the sizing composition further comprises a film-forming material different from the polyamide, acrylic polymer and the fiber lubricant.

* * * * *